US009100445B2

(12) United States Patent
Gao et al.

(10) Patent No.: US 9,100,445 B2
(45) Date of Patent: Aug. 4, 2015

(54) METHOD AND DEVICE FOR USER MANAGEMENT IN PRESENCE SYSTEM AND PRESENCE SYSTEM

(75) Inventors: Zhi Guo Gao, Beijing (CN); Zhe Xiang, Beijing (CN); Wei Xue, Beijing (CN); Bo Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1596 days.

(21) Appl. No.: 12/324,963

(22) Filed: Nov. 28, 2008

(65) Prior Publication Data

US 2009/0144426 A1 Jun. 4, 2009

(30) Foreign Application Priority Data

Nov. 30, 2007 (CN) .......................... 2007 1 0196340

(51) Int. Cl.
*G06F 15/173* (2006.01)
*H04L 29/08* (2006.01)

(52) U.S. Cl.
CPC ...................................... *H04L 67/24* (2013.01)

(58) Field of Classification Search
CPC .. H04L 67/24; H04L 12/5815; H04L 65/1066
USPC ................... 709/223, 224, 225, 226
See application file for complete search history.

(56) References Cited

U.S. PATENT DOCUMENTS

| 2006/0117050 | A1 | 6/2006 | John | |
| 2006/0167978 | A1* | 7/2006 | Ozugur et al. | 709/203 |
| 2006/0190591 | A1 | 8/2006 | Bobde | |
| 2007/0078986 | A1 | 4/2007 | Ethier | |

FOREIGN PATENT DOCUMENTS

EP 01441486 7/2004

OTHER PUBLICATIONS

Rosenberg, J., "A Presence Event Package for the Session Initiation Protocol (SIP)", RFC 3856, Aug. 2004.
Singh, V.K., "Presence Traffic Optimization Techniques", IEEE PMIRC, Oct. 28, 2006.
Wook, H., "Design of Presence Agent Server for SIP-based Presence Services", pp. 397-400, ICACT, Jul. 11, 2005.

* cited by examiner

*Primary Examiner* — Liangche A Wang
*Assistant Examiner* — Cheikh Ndiaye
(74) *Attorney, Agent, or Firm* — Janice Kwon; Anne Vachon Dougherty

(57) ABSTRACT

To reduce traffic between multiple servers in a presence system and improve the performance of the presence system, a method and device is provided for user-management in a presence system, and a presence system. The presence system comprises multiple presence servers communicating through a network, and said device for user-management comprises a combining means for combining multiple user sets among which there are the greatest correlations into a user set to be allocated; and an allocating means for allocating said user set to be allocated to one presence server which can contain said user set to be allocated. Through allocating multiple user sets among which there are the greatest correlations to a same presence server, communications among users in the user set are performed within a same presence server, reducing occupations for network resources and improving performance of the presence system.

18 Claims, 9 Drawing Sheets

METHOD AND DEVICE FOR USER MANAGEMENT IN PRESENCE SYSTEM AND PRESENCE SYSTEM

FIELD OF THE INVENTION

The present invention generally relates to a presence system, and more particularly, to a method and device for user-management in a presence system.

BACKGROUND OF THE INVENTION

Telecommunication service providers already know that users use more communication services than ever before in both their personal and professional lives. But to take advantage of this array of devices and drive new levels of customer service and revenue in the years ahead, the telecommunication service providers must master presence information of each user in the presence system. The status information refers to a user's availability, capability and willingness to be contacted. The presence server is a back-end component providing presence functionality. It maintains online status information for each user and web conference and also ensures that users can subscribe to information about online status (also called "presence information") of other users.

It is assumed that a user A subscribes to view presence information of user B from a presence server who is in charge of managing a presence server of user B, then the presence server notifies user A of changed presence information when the online status of user B changes. The user A subscribing to the presence information is also called user B's watcher.

FIGS. 1A and 1B show a presence system in the prior art. As shown, a presence system 100 includes 5 presence servers (PSs) 120a-120e and 5 users (or present entities (PEs)) 110a-110e. Presence Agents (PA) 130a-130e are respectively located in the PSs 120a-120e.

It should be appreciated that, the number of PSs, users or PAs allowed to be included in a practical presence system is not limited to 5, and a great many more devices can also be included therein.

A PA 130 collects presence information of a corresponding PE 110, and provides the presence information to one or more watchers (for example, a caller or an initiator of a communication session) of the PE 110. Further, when the PE 110 acts as a watcher of another user, the PA 130 provides the PE 110 with the received presence information of another user.

For the sake of simplicity, in FIGS. 1A and 1B, for one PE 110, only a single PA 130 is shown. However, it should be appreciated that, one PE 110 may have multiple PAs 130 of which each is in charge of a subset of all the valid subscriptions (presence information requests from watchers) for the PE 110.

An end user, for example the PE 110a, registers into the presence service by sending to its presence agent PA 130a a PUBLISH message including presence information of PE 110a (for instance, formatted as PIDF format), as shown in FIG. 1B.

Other users interested in the presence information of PE 110a, such as PEs 110b-110e, send SUBSCRIBE messages to their corresponding presence agents PAs 130b-130e respectively, which then send the SUBSCRIBE messages to the presence agent of the PE 110a, i.e., PA 130a. Therefore, these users, PEs 110b-110e, become watchers of PE 110a.

Although 4 watchers are shown in the example of FIGS. 1A and 1B, it should be appreciated that more watchers can be involved in practical implementations, and presence agents of these watchers can be located in the same or another presence server.

When the presence information of the watched PE 110a changes, the presence server can send NOTIFY messages including the changed presence information of the PE 110a to these watchers. This process is called a SUBSCRIBE/NOTIFY process, as shown in FIG. 1A.

When desiring to change its presence status, the PE 110a will send another PUBLISH message with new presence information. Upon reception of the PUBLISH message, the presence agent PA 130a sends NOTIFY messages to presence agents of all the watchers PEs 110b-110e, i.e., PAs 130b-130e, which then send the NOTIFY messages to all the watchers PEs 110b-110e. This process is referred to a PUBLISH/NOTIFY process, as shown in FIG. 1B.

The current presence service is constructed on the basis of presence servers. But each presence server's capacity to manage users is very limited. The presence service should preferably be a real-time service, since the SUBSCRIBE/NOTIFY and PUBLISH/NOTIFY processes are delay-sensitive and end users do not tolerate delay in the application. The presence server's limited capacity limits user capability of each presence server. So, to provide the presence service, multiple presence servers are usually deployed.

However, introducing a number of presence servers also results in a new problem, that is, inter-presence server traffic is very high because most of each user's presence agents are located in different presence servers. In this example, one SUBSCRIBE/NOTIFY process will result in 1+1 messages, for instance, a SUBSCRIBE message from the presence server PS 120b to the presence server PS 120a and a NOTIFY message from the presence server PS 120a to the presence server PS 120b. Additionally, in this example, one PUBLISH/NOTIFY process will result in n NOTIFY messages (wherein n is the total number of presence servers where presence agents of watchers are located), for example, 4 NOTIFY messages from the presence server PS 120a to the presence servers PSs 120b-120e. In the case that most of messages are transferred across different servers, i.e., most of the presence agents of the user and watchers thereof are located in different presence servers, a huge traffic burden for the presence service is raised due to limitations in communication capacities, time delays and processing abilities among presence servers.

SUMMARY OF THE INVENTION

The present invention reduces such inter-presence server traffic, thereby improving the performance of the presence system.

According to a first aspect of the present invention, there is provided a method for user-management in a presence system, comprises: a combining step in which multiple user sets that have the greatest correlations are combined into a user set to be allocated; and an allocating step in which the user set to be allocated is allocated to one presence server which can contain the user set to be allocated.

According to a second aspect of the present invention, there is provided a device for user-management in a presence system, comprising a combining means for combining multiple user sets that have the greatest correlations into a user set to be allocated and an allocating means for allocating a user set to be allocated to one presence server which can contain the user set to be allocated.

According to a third aspect of the present invention, there is provided a presence system comprising the above device for user-management.

BRIEF DESCRIPTION ON THE DRAWINGS

Other features, applications and advantages of the present invention will become apparent through detailed descriptions of embodiments of the present invention with reference to the drawings in which a same reference number represents a same or corresponding component or step, wherein.

DETAILED DESCRIPTION OF THE INVENTION

In the present invention, an end user's location feature is considered, thus if a presence agent of one user and presence agents of the user's watchers are located in a same presence server, the above SUBSCRIBE and NOTIFY messages should be transferred within the presence server. In this scenario, inter-presence server communications will not be introduced, thereby reducing network traffics.

Under the present invention presence agents of the users with the greatest correlation are migrated to a same presence server as much as possible, thereby reducing message transfers across presence servers. The meaning of "the greatest correlation" can vary from specific applications, for example, it may refer to the case that average communication traffic between two user sets is the largest, the geographical distance between two user sets is the shortest, two user sets belong to one company, or the like. Said average communication traffic refers to the average traffic of all the possible communication connections between all the users of one of two user sets and all the users of the other of two user sets, and the specific calculating method thereof may include that the total communication traffic between all the users of one of two user sets and all the users of the other of two user sets is divided by the product of the number of users of one of two user sets and the number of users of the other of two user sets, wherein the product represents the total number of all the possible communication connections between all the users of one of two user sets and all the users of the other of two user sets. This concept will be further illustrated hereinbelow.

Figure 1A:
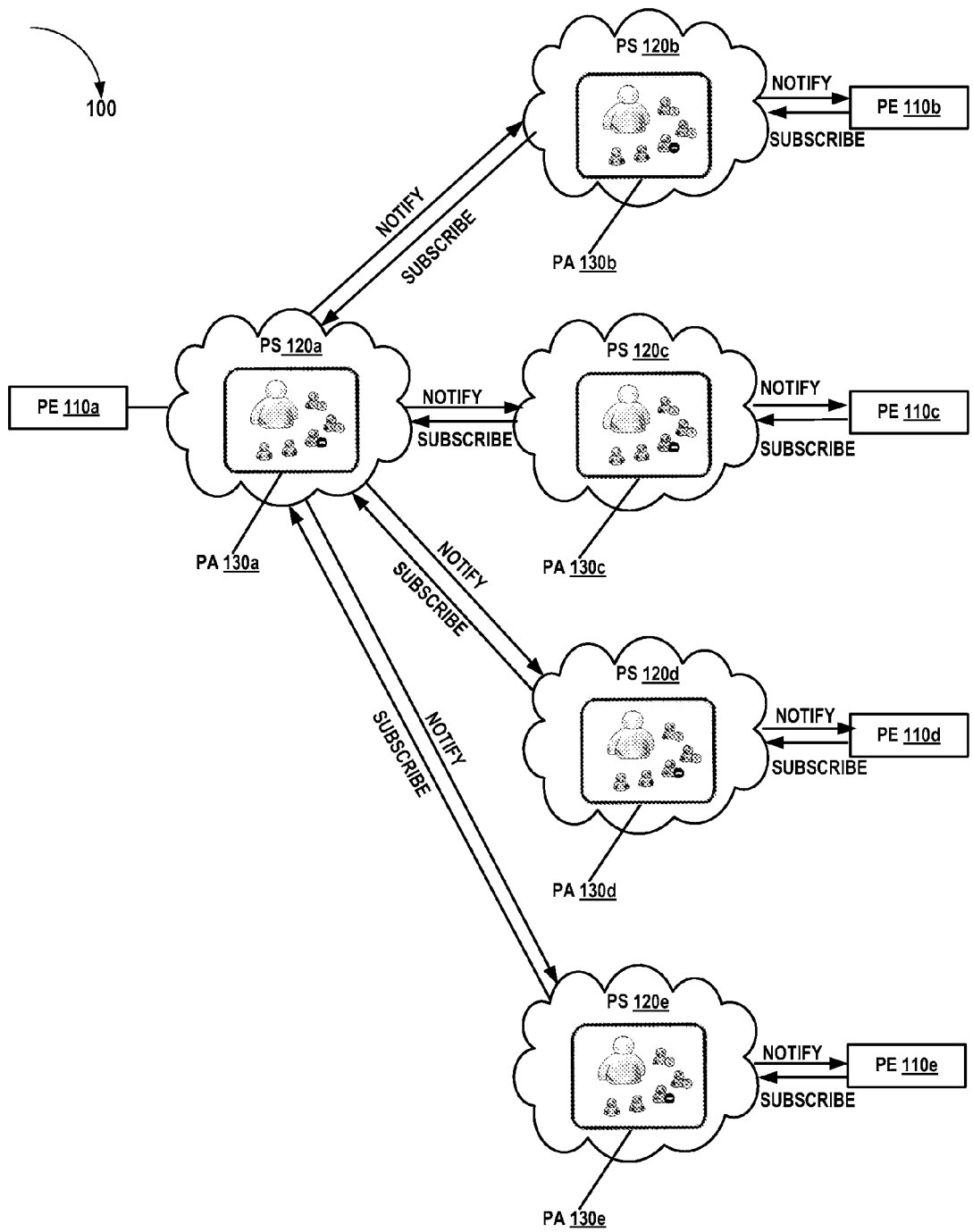
FIGS. 1A and 1B show a presence system in the prior art.
Figure 1B:
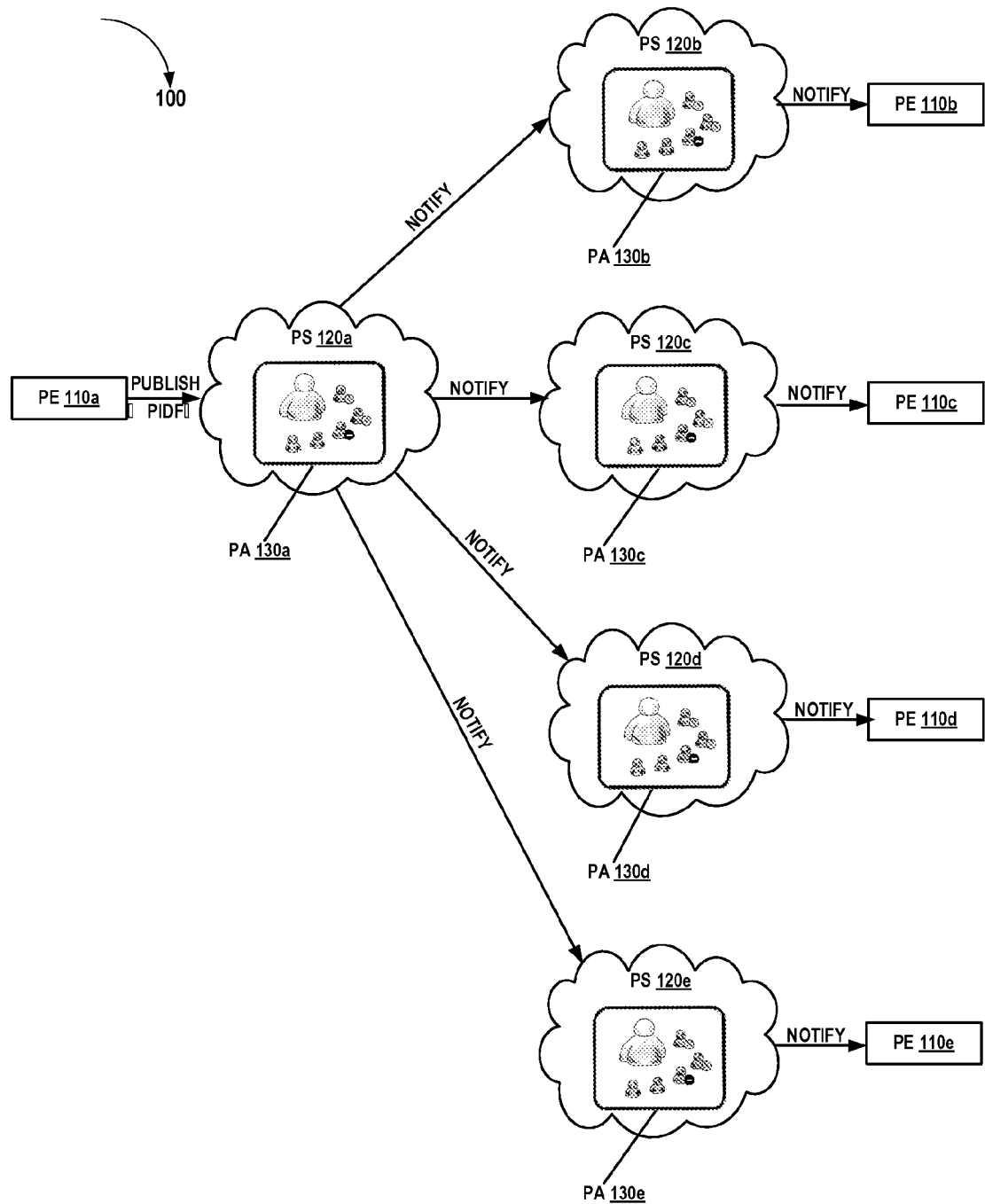
Figure 2A:
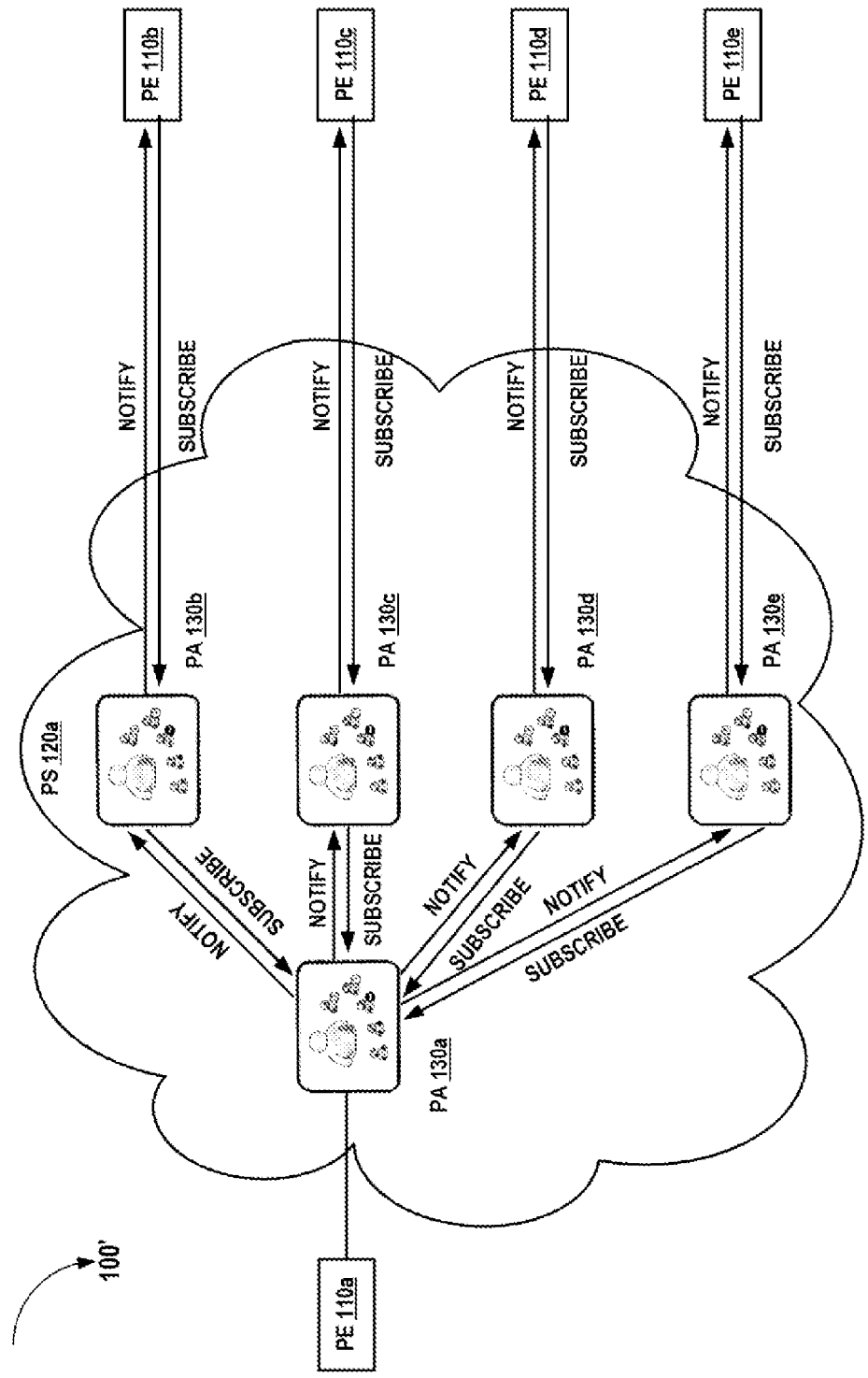
FIGS. 2A and 2B show an example of a part of a presence system according to the present invention.
Figure 2B:
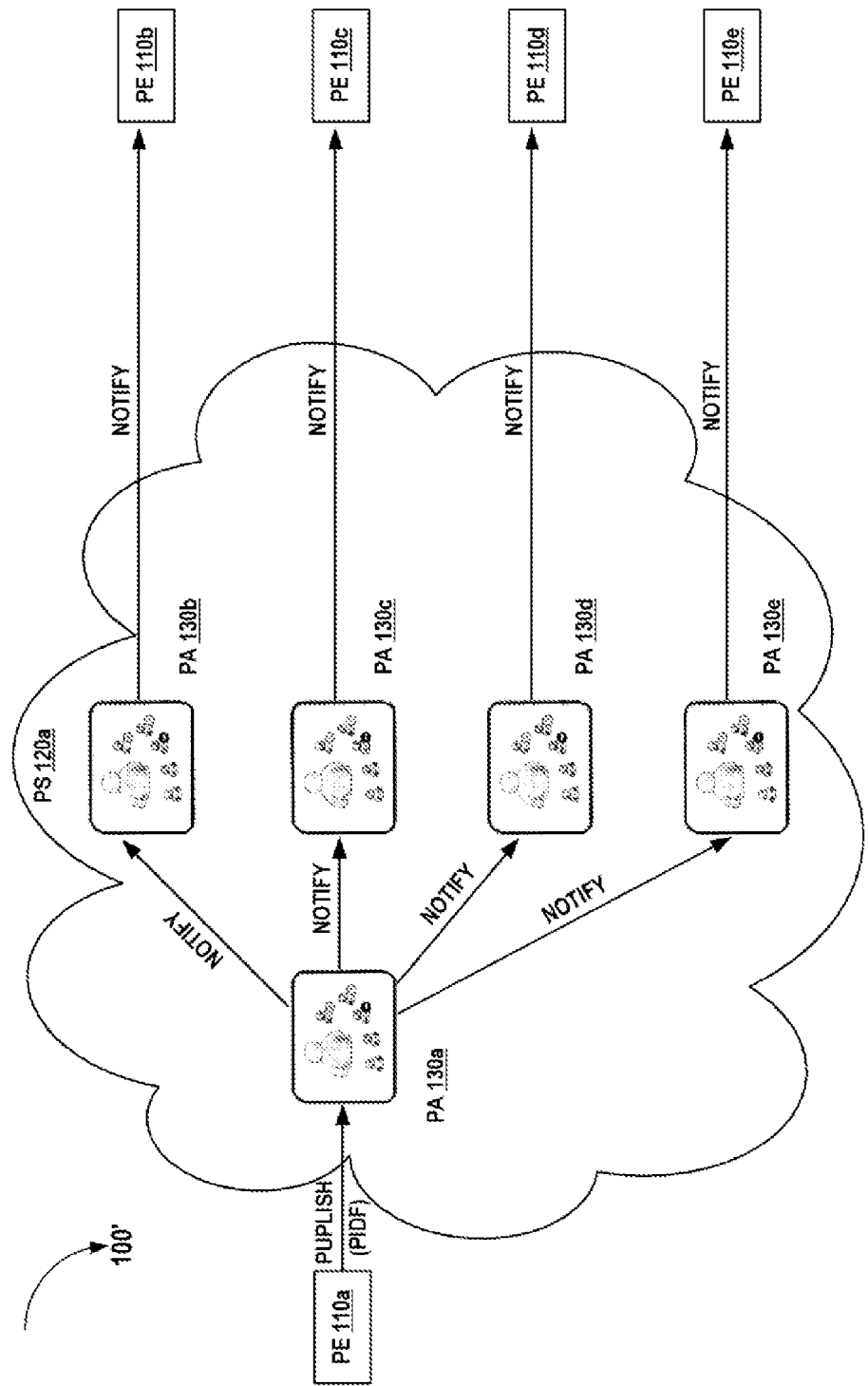

FIGS. 2A and 2B show an example of a part of presence system 100' according to the present invention. The presence system 100' is constructed by applying the method of the present invention to the presence system 100 shown in the prior art in FIGS. 1A and 1B. Therefore, only differences between FIGS. 2A-2B and FIGS. 1A-1B are described hereinafter.

As shown in FIGS. 2A and 2B, in the presence system 100', the presence agent PA 130a of user PE 110a and the presence agents PAs 130b-130e of PA 130a's watchers PEs 110b-110e are located in a same presence server (for example, the PS 120a). In this case, the SUBSCRIBE and NOTIFY messages between the presence agent PA 130a and presence agents PAs 130b-130e are transferred within the same presence server PS 120a.

It should be appreciated that, in the presence system 100', not all of the presence agents of the user and the user's watchers would likely be located in a same presence server. As an example, when the total number of the user and watchers exceeds the maximum number of users that a corresponding presence server can contain, their presence agents may be located in multiple presence servers. At which server(s) the presence agents of the user and the user's watchers are located in is dependent on the specific application as well as the selected criteria that are pre-defined. It should be appreciated that, the present invention is still able to reduce inter-presence server communications even if it is unable to make all of the presence agents of the user and presence agents of the user's watchers located in a same presence server.

It should also be understood that FIGS. 2A and 2B are merely simplified schematic diagrams. In a practical present system, each user usually acts as both present entity and watcher. Obviously, the principle of the present invention is also applicable even in this situation.

Figure 3:
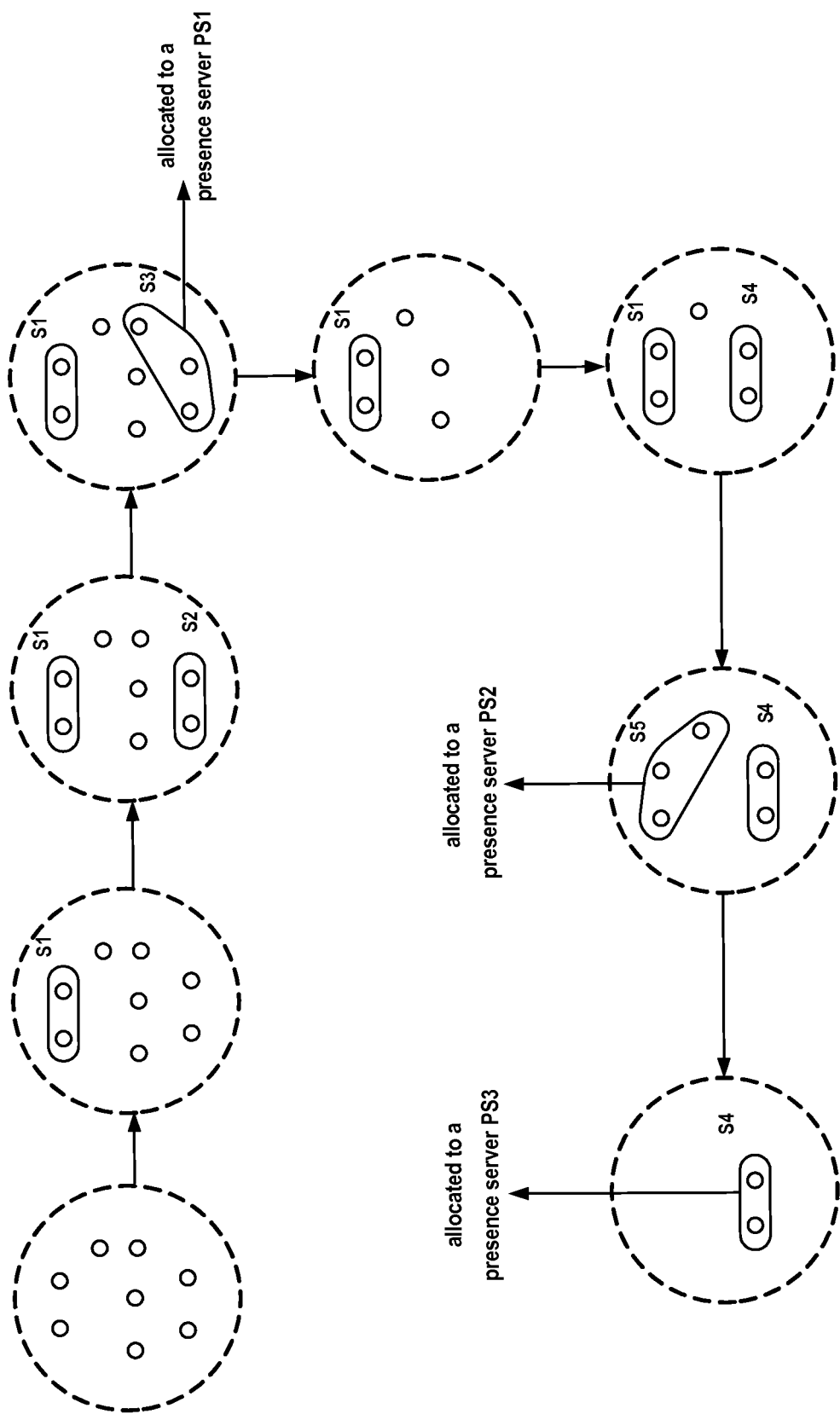
FIG. 3 is a schematic diagram illustrating a principle of a method for user-management according to the present invention.

FIG. 3 is a schematic diagram illustrating a principle of a method for user-management according to the present invention. In the figure, each circle represents one user set. Initially, only one user is included in each user set. As shown in the figure, two user sets with the greatest correlation are combined into a user set, for example, S1. Next, from the user set S1 and other user sets, two user sets with the greatest correlation are selected, and then combined into a user set, for example, S2. The process is not stopped until the number of users in the acquired largest user set (that is, the user set having the maximum number of users, for instance, user set S3) meets a pre-defined criteria and does not exceed the number of users that the current presence server (for example, PS1) can contain. The pre-defined criteria may be pre-set by operators, service providers or the like according to specific applications. Then, the user set S3 is allocated to the current presence server PS1. The above process is performed again on other users having not been allocated, until a next largest user set, for example S5, which meets the pre-defined criteria and of which the number of users does not exceed the number of users that a next presence server (for instance, PS2) can contain is acquired. Then, the user set S5 is allocated to the next presence server PS2. The above process is executed continuously until the last user set S4 is allocated to a presence server, for instance PS3 which is able to contain the user set S4. Thus, allocations for all user sets are finished, and the result thereof is that users with the greatest correlation are allocated to a same presence server as much as possible.

It should be appreciated that FIG. 3 is only intended to illustrate the principle of the present invention, but not to limit it. For instance, in the above description, "current presence server" and "next presence server" are not to indicate or imply any certain determined order between presence servers. In practice, "current presence server" and "next presence server" are selected randomly or based on a predetermined rule. The predetermined rule may be pre-set by operators, service providers etc. according to specific applications as well.

As another example, in the above description, the number of user sets, the number of users in a user set and the acquired allocating relationship between a user set and a presence server are merely illustrative.

Figure 4:
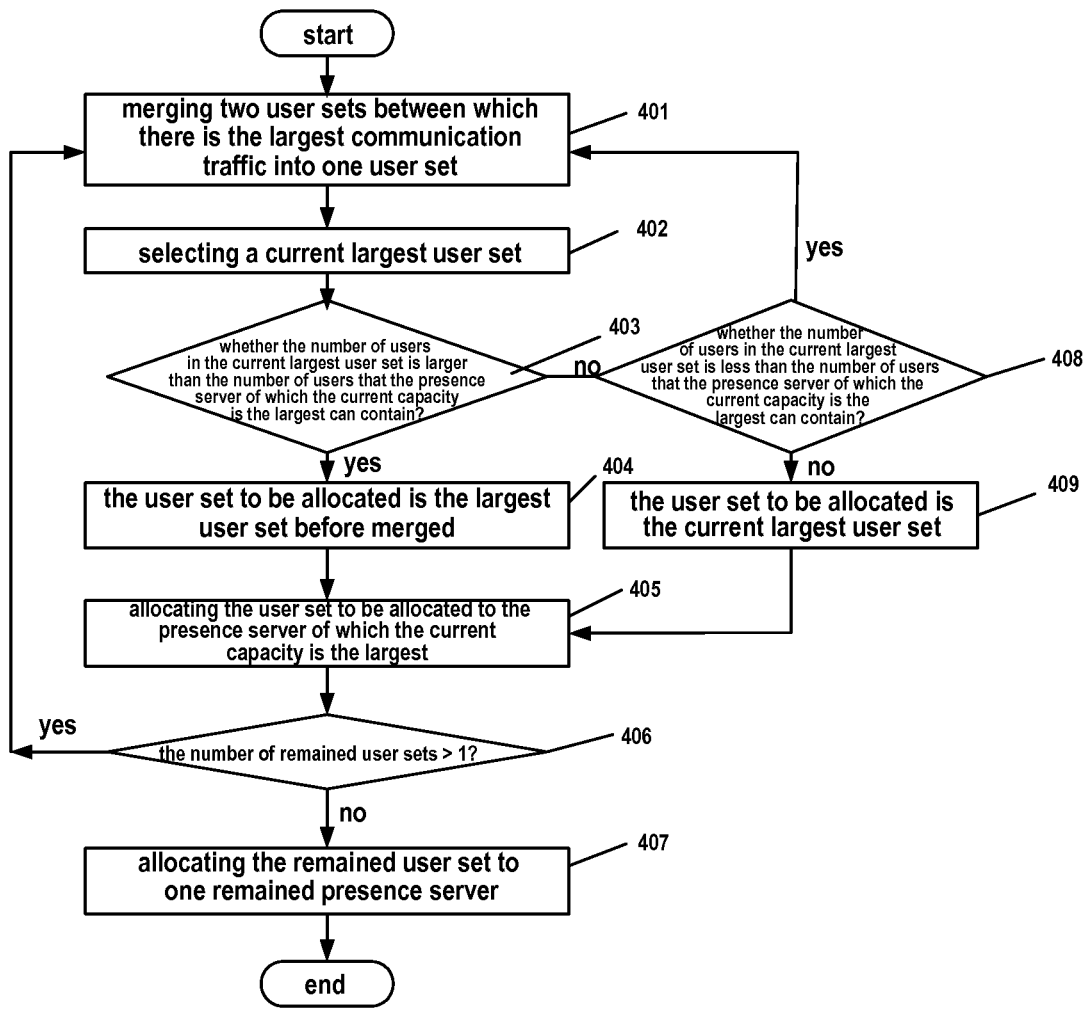
FIG. 4 is a flowchart showing one embodiment of the method for user-management according to the present invention.
Figure 5:
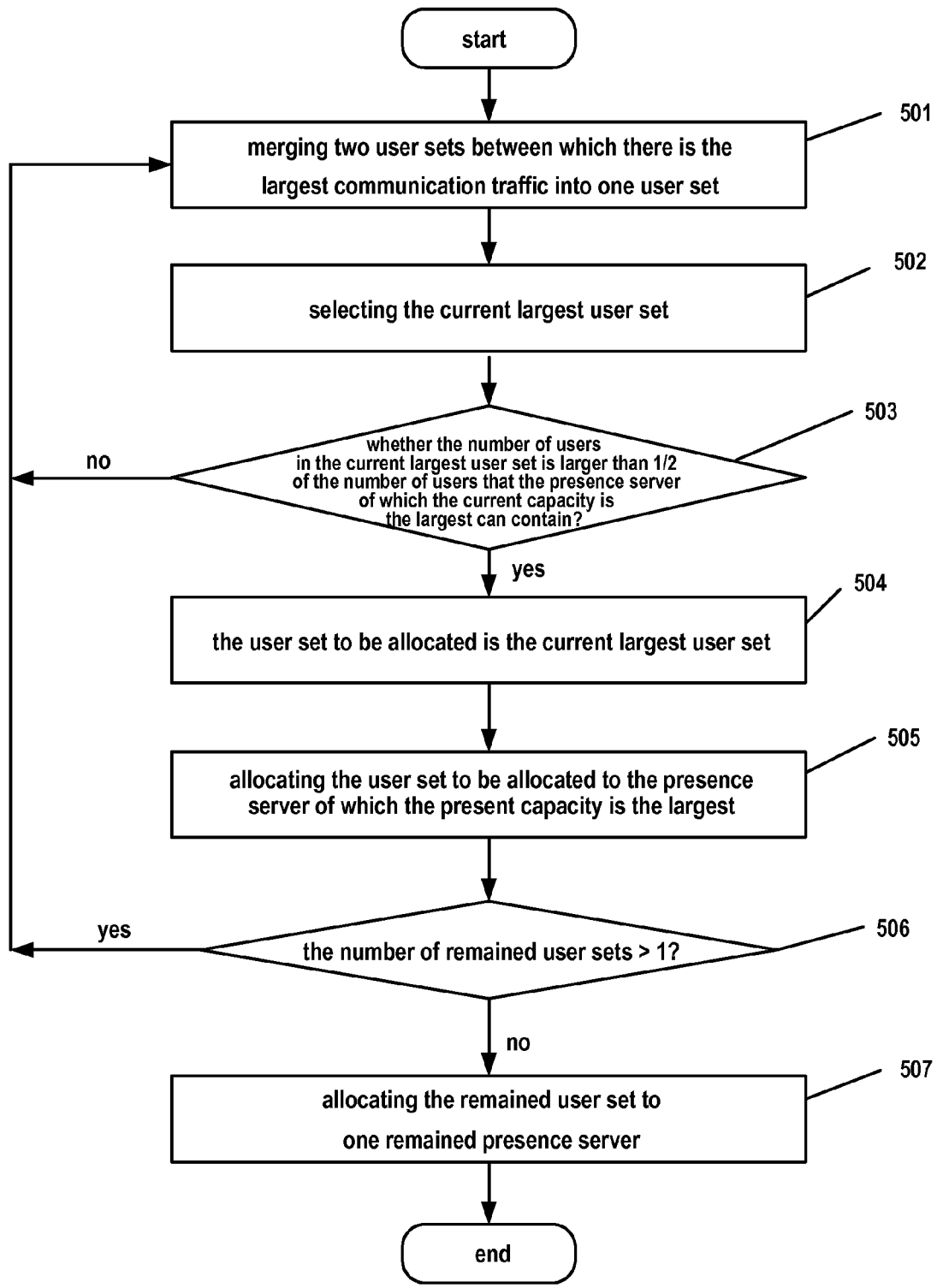
FIG. 5 is a flowchart showing another embodiment of the method for user-management according to the present invention.

Preferred embodiments of the method in accordance with the present invention are specifically described in conjunction with flow charts of FIGS. 4 and 5.

FIG. 4 is a flowchart showing one preferred embodiment of a method for user-management according to the present invention. The method shown in FIG. 4 begins with step 401. In the step 401, two user sets between which the average communication traffic is the largest are merged into one user set. In step 402, a current largest user set is selected. In step 403, it is determined whether the number of users in the largest user set after this merging operation exceeds the number of users that the presence server with the largest allocable capacity (hereunder, the term "capacity" refers to the "allocable capacity") or a specific presence server to be allocated can contain.

On one hand, the user set acquired after this merging operation can not be allocated to any current allocable presence servers, if the result of step 403 determines that the number of users in the largest user set after this merging operation has exceeded the number of users that the presence server with the current largest capacity or a specific presence server to be allocated can contain. This merging operation should be cancelled, and from the user sets after the cancelling process (in other words, the user sets before this merging operation), a largest user set is selected to be allocated. Then the method proceeds to step 404. In step 404, it is determined that the largest user set before this merging operation is used as the one to be allocated. Next, the method proceeds to step 405. In the step 405, the user set to be allocated is allocated to the presence server of which the current allocable capacity is the largest, a specific presence server to be allocated, or the presence server of which the current allocable capacity is larger than and closest to the number of users in the user set to be allocated. The presence servers where user sets have been allocated are excluded from the set of allocable presence servers, or can be kept in the set of allocable presence servers so as to be allocated next time after the allocable capacity of the presence server where user sets have been allocated is adjusted (that is, the capacity acquired by subtracting the number of users in the user set allocated this time from the allocable capacity of the presence server before this allocation is used as the current allocable capacity of the presence server).

Next, the method proceeds to step 406. In step 406, it is determined whether the number of remaining user sets is larger than 1. If the result of step 406 is no, the method proceeds to step 407. In the step 407, the remaining user sets are allocated to one suitable presence server in the set of allocable presence servers. Next, the method for user-management of the preferred embodiment is ended.

If the result of step 406 is yes, the method returns to the step 401.

On the other hand, if the result of the step 403 shows that the number of users in the largest user set after this merging operation is not larger than the number of users that the presence server of which the current capacity is the largest can contain, the method proceeds to the step 408. In the step 408, it is determined whether the number of users in the current largest user set is less than the number of users that the presence server of which the current allocable capacity is the largest, or less than a certain ratio of the largest allocable capacity of the current allocable presence server, for example, 80% or others. If the result of step 408 is yes, the method returns to the step 401. If the result of step 408 is no, the method proceeds to step 409. In step 409, it is determined that the current largest user set is the user set to be allocated. Next, the method proceeds to step 405 and continues performing till the end.

Preferably, the steps 408 and 409 among the above steps can be omitted, since the solution of the present invention is still executable if the step goes to step 401 when the result of step 403 determines that the number of users in the largest user set after this merging operation is not larger than the number of users that the presence server of which the current capacity is the largest can contain.

In the method shown in FIG. 4, the average communication traffic between two user sets can be calculated according to the following formula:

$$T(Oi, Oj) = \frac{\sum_{j=1}^{q}\sum_{i=1}^{p} T(Bi, Bj)}{p \cdot q}$$

wherein $O_i$ refers to a user set including p users and $O_j$ a user set including q users; initially, p=1 and q=1; $B_i$ stands for one user of the user set $O_i$ and $B_j$ one user of the user set $O_j$; $T(B_i, B_j)$ represents communication traffic between one user of the user set $O_i$ and one user of the user set $O_j$ and $T(O_i, O_j)$ average communication traffic between the user sets $O_i$ and $O_j$.

According to specific applications, other operations can be performed after the above user-allocation is finished. For instance, presence agents of each user are migrated to corresponding presence servers according to a resulting user set distribution as the result acquired through the user set-allocation process. After such migration, those users with a relatively large correlation are aggregated. If having been migrated, the presence agent of a certain user notifies the user's watchers of the migration information after this migration, those watchers can perform a corresponding update. Furthermore, the present agent of the user may also notify the server maintaining the registration status of the user, for example, a front-end registration presence agent, of the migration information. Thus, when the user initiates a new session, for instance, by logging into a presence service, the front-end registration presence agent will dispatch and route the user's messages to the migrated presence agent.

FIG. 5 is a flowchart showing another embodiment of the method for user-management according to the present invention. The method for user-management in FIG. 5 begins with step 501. In the step 501, two user sets between which the average communication traffic is the largest are merged into one user set. In step 502, the current largest user set is selected. In step 503, it is determined whether the number of users in the current largest user set is larger than or equal to ½ of the number of users that the presence server of which the current allocable capacity is the largest can contain.

If the result of step 503 is yes, the method proceeds to step 504. In step 504, it is determined that the current largest user set is the user set to be allocated. Next, the method proceeds to step 505. In step 505, the user set to be allocated is allocated to the presence server of which the current capacity is the largest, or the presence server of which the current allocable capacity is larger than and closest to the number of users in the user set to be allocated. The presence servers where user sets have been allocated are excluded from the set of allocable presence servers, or can be kept in the set of allocable presence servers so as to be allocated next time after the allocable capacity of the presence server in which user sets have been allocated is adjusted (that is, the capacity acquired by subtracting the number of users in the user set allocated this time from the allocable capacity of the presence server before this allocation is used as the current allocable capacity of the presence server). Next, the method proceeds to step 506. In step 506, it is determined whether the number of remaining user sets is larger than 1. If the result of step 506 is no, the method proceeds to step 507. In step 507, the remaining user set is allocated to one remaining presence server. Next, the method for user-management of the preferred embodiment is ended.

If the result of step 503 is no, the method returns to step 501 and keeps performing the step of merging user sets.

Although in the above step 503 the pre-defined threshold is ½ of the number of users that the presence server of which the current capacity is the largest can contain, it should be appreciated that the pre-defined threshold implementing the present invention is not limited to this but can be pre-set by operators, service providers or the like according to specific applications.

Figure 6:
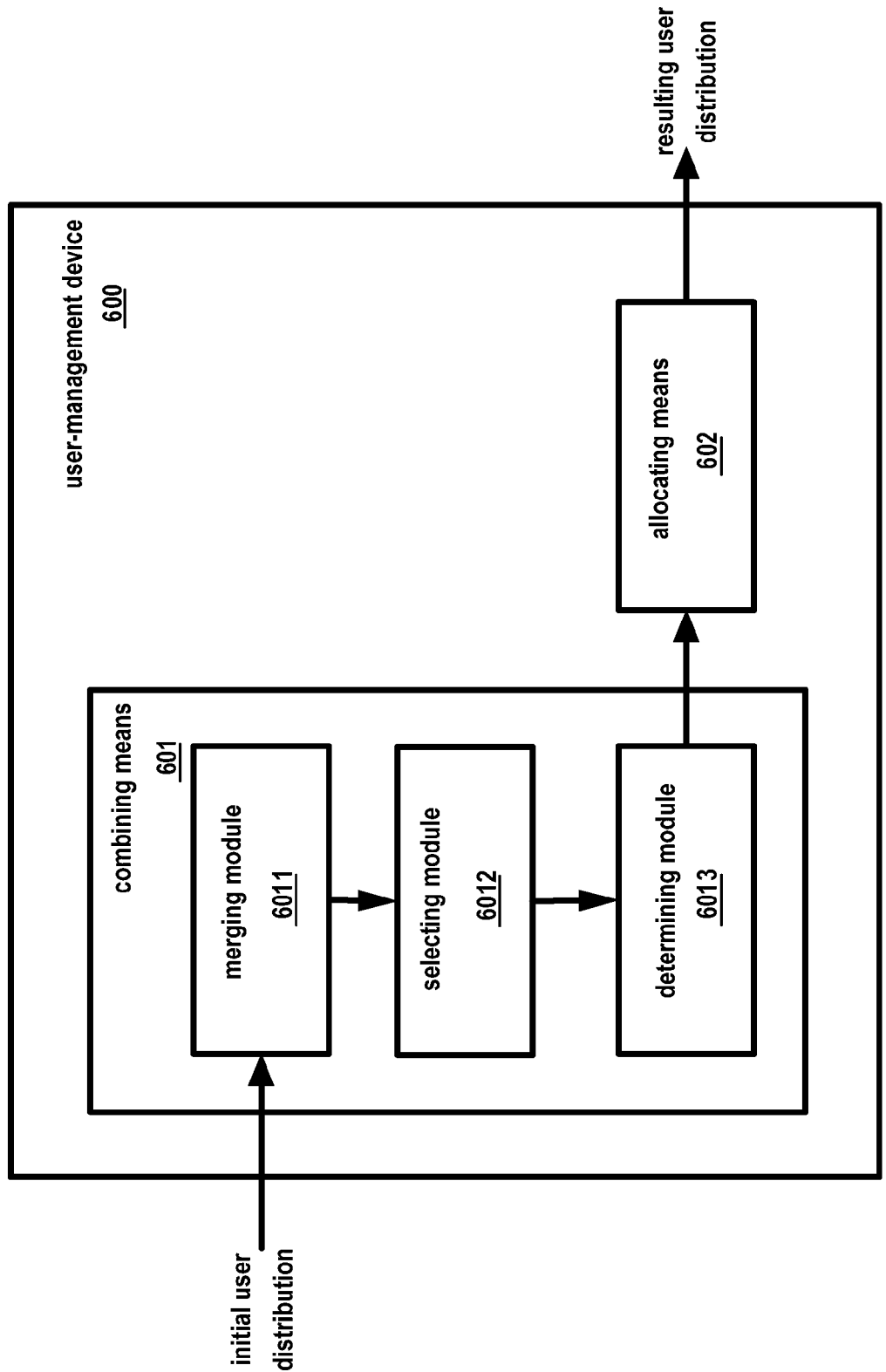
FIG. 6 is a block diagram showing one embodiment of a device for user-management according to the present invention.

FIG. 6 shows a schematic block diagram illustrating one embodiment of a device for user-management for use in executing the method for user-management as shown in FIG. 4 according to the present invention. As shown in the figure, a user-management device 600 may include a combining means 601 for combining multiple user sets among which average communication traffic is the largest into a user set to be allocated, and an allocating means 602 for allocating the user set to be allocated to a presence server of which the current capacity is the largest.

The combining means 601 includes a merging module 6011 for merging two user sets between which the average communication traffic is the largest into one user set, a selecting module 6012 for selecting the current largest user set, and a determining module 6013 for determining whether the current largest user set or the largest user set before merging should be treated as the user set to be allocated when the number of users in the current largest user set is larger than or equal to the number of users that the presence server of which the current capacity is the largest can contain.

The determining module 6013 is used to determine whether the number of users in the largest user set after this merging operation satisfies the pre-defined critical condition after the merging module 6011 performs the user set-merging operation each time. If the pre-defined critical condition is satisfied, the largest user set before this merging operation is treated as the user set to be allocated; while, if the critical condition is not satisfied, the merging module 6011 keeps performing the next merge. Said critical condition is that the size of the user set acquired after this merging operation just exceeds the capacity of the presence server of which the current capacity is the largest.

In one embodiment of the present invention, the user-management device 600 further includes a migrating means (not shown) for migrating the presence agents of users in the user set to be allocated to the corresponding presence server according to the result outputted by the allocating means 602.

Figure 7:
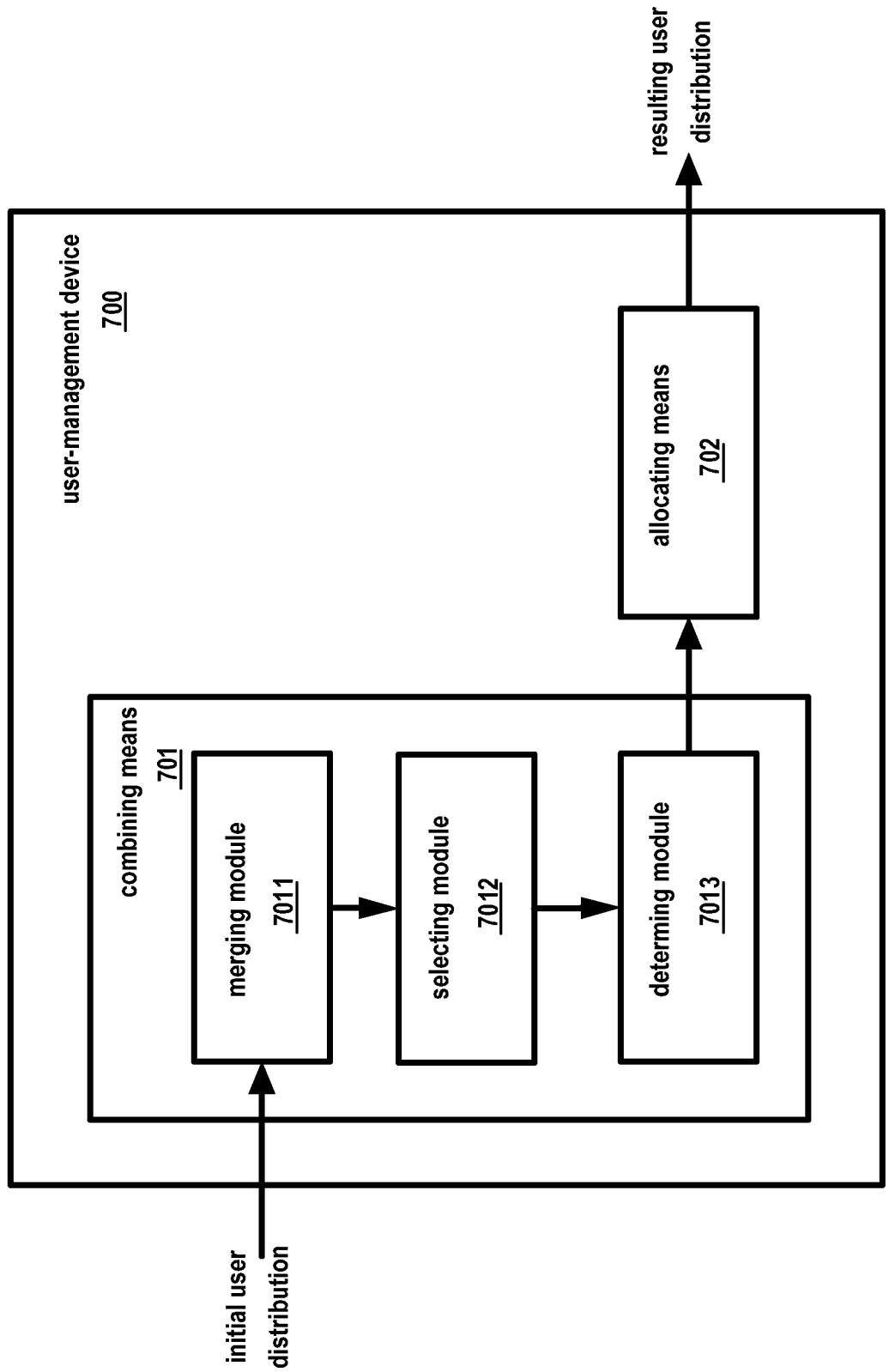
FIG. 7 is a block diagram showing another embodiment of the device for user-management according to the present invention.

FIG. 7 shows a schematic block diagram illustrating one embodiment of a device for user-management for use in executing the method for user-management as shown in FIG. 5 according to the present invention. As shown in the figure, a user-management device 700 may include a combining means 701 for combining multiple user sets among which average communication traffic is the largest into a user set to be allocated, and an allocating means 702 for allocating the user set to be allocated to a presence server of which the current capacity is the largest.

The combining means 701 includes a merging module 7011 for merging two user sets with the greatest correlation into one user set, a selecting module 7012 for selecting the current largest user set, and a determining module 7013 for determining that the current largest user set is treated as the one to be allocated when the number of users in the current largest user set is larger than or equal to ½ of the number of users that the presence server of which the current capacity is the largest can contain.

In one embodiment of the present invention, the user-management device 700 further includes a migrating means (not shown) for migrating the presence agents of the users in the user set to be allocated to the corresponding presence server according to the result outputted by the allocating means 702.

Although in the above determining module 7013 the pre-defined threshold is ½ of the number of users that the presence server of which the current capacity is the largest can contain, it should be appreciated that the pre-defined threshold implementing the present invention is not limited to this but can be pre-set by operators, service providers or the like according to specific applications.

Through adopting the user-management device of the present invention, for example, the one shown in FIG. 6 or 7, the resulting user set distribution is acquired according to the initial user set distribution. According to the resulting user set distribution, the presence agents of users can be migrated to a corresponding presence server, thereby aggregating those users among which there are relatively larger correlations.

It should be appreciated that the user-management device of the present invention can be a separate device or contained in any existing or later-developed devices. Additionally, the migrating means is located in the user-management device in the above description, but it obviously can be a separate device or contained in any existing or later-developed devices.

The present invention further provides a presence system including the user-management device according to the present invention.

It should be appreciated that modules and/or means related in the present invention can be respectively implemented in multiple components or in one component as a whole. The present invention can be implemented in complete-hardware, complete-software for execution by one or more processors, or the combination of hardware and software units.

Those skilled in the art should recognize that the novel principle described in the present invention can be modified and changed for various applications. So, the scope of the subject of the application should be defined by the appended claims and not limited to any said specific exemplary description.

What is claimed is:

1. A method for user-management in a presence system, said presence system comprises multiple presence servers communicating through a network, said method comprising:
   a combining step, in which multiple user sets, each comprising a plurality of users, that have a greatest correlation are combined into a user set to be allocated; and
   an allocating step, in which said user set to be allocated is allocated, for registration of said plurality of users in said user set to be allocated, to one presence server that can contain said user set among the multiple presence servers, wherein said combining step comprises:
  a merging step, in which two user sets that have a greatest correlation are merged into one user set;
  a selecting step, in which a current largest user set is selected;
  a comparing step for comparing a number of users in said current largest user set with a pre-defined threshold; repeating said merging and selecting steps until a number of users in said current largest user set is larger than the pre-defined threshold, if the number of users in said current largest user set is less than or equal to the pre-defined threshold; and
  a determining step, in which said current largest user set is treated as said user set to be allocated.

2. The method for user-management of claim 1, wherein said pre-defined threshold comprises:
  a number of users that said one presence server can contain;
  and wherein said merging and selecting steps are repeated until a number of users in said current largest user set is larger than a number of users that said one presence server can contain, when a compared result shows that the number of users in the current largest user set is less than or equal to the number of users that said one presence server can contain; and
  wherein in the determining step, the largest user set is treated as said user set to be allocated before a latest merging operation, and the latest merging operation is canceled.

3. The method for user-management of claim 1, wherein said pre-defined threshold is ½ of the number of users that said one presence server can contain.

4. The method for user-management of claim 1, further comprising a migrating step in which presence agents of the users in said user set to be allocated are migrated to said one presence server according to the result of said allocating step.

5. The method for user-management of claim 1, wherein the greatest correlation refers to a case that average communication traffic between two user sets is largest.

6. The method for user-management of claim 1, wherein the greatest correlation refers to a case that a graphical distance between two user sets is shortest.

7. The method for user-management of claim 1, wherein said presence server is the presence server of which current capacity is largest.

8. A device for user-management in a presence system, said presence system comprises multiple presence servers communicating through a network, said device comprising:
  a combining means for combining multiple user sets, each comprising a plurality of users, that have a greatest correlation into a user set to be allocated; and
  an allocating means for allocating said user set to be allocated, for registration of said plurality of users in said user set to be allocated, to one presence server which can contain said user set to be allocated,
  wherein said combining means comprises:
  a merging module for merging two user sets that have a greatest correlation into one user set;
  a selecting module for selecting a current largest user set; and
  a determining module for comparing a number of users in said current largest user set with a pre-defined threshold; whereby operations performed by said merging and selecting modules are repeated until a number of users of said current largest user set is larger than a pre-defined threshold, if the number of users in said current largest user set is less than or equal to the pre-defined threshold, and for determining that said current largest user set is treated as said user set to be allocated.

9. The device for user-management of claim 8, wherein said pre-defined threshold comprises:
  a number of users that said one presence server can contain, whereby said operations performed by said merging and selecting modules are repeated until a number of users in said current largest user set is larger than a number of users that said one presence server can contain, when a compared result shows that a number of users in a current largest user set is less than or equal to a number of users that said one presence server can contain, and said determining module determines that the largest user set before a latest combination is treated as a user set to be allocated and cancels the latest merging.

10. The device for user-management of claim 8, wherein said pre-defined threshold is ½ of the number of users that said one presence server can contain.

11. The device for user-management of claim 8, further comprising a migrating module for migrating presence agents of the users in said user set to be allocated to said one presence server according to the result of said allocating step.

12. The device for user-management of claim 8, wherein said greatest correlation refers to a case that average communication traffic between two user sets is largest.

13. The device for user-management of claim 8, wherein said greatest correlation refers to a case that a graphical distance between two user sets is shortest.

14. The device for user-management of claim 8, wherein said presence server is the presence server of which current capacity is largest.

15. A presence system comprising:
  a plurality of presence servers; and
  a device for user-management in a presence system, said presence system comprises multiple presence servers communicating through a network, said device comprising:
    a combining means for combining multiple user sets, each comprising a plurality of users, that have a greatest correlation into a user set to be allocated; and
    an allocating means for allocating said user set to be allocated, for registration of said plurality of users in said user set to be allocated, to one presence server which can contain said user set to be allocated,
    wherein said combining means comprises:
  a merging module for merging two user sets that have a greatest correlation into one user set;
  a selecting module for selecting a current largest user set; and
  a determining module for comparing a number of users in said current largest user set with a pre-defined threshold; whereby operations performed by said merging and selecting modules are repeated until a number of users of said current largest user set is larger than a pre-defined threshold, if the number of users in said current largest user set is less than or equal to the pre-defined threshold, and for determining that said current largest user set is treated as said user set to be allocated.

16. The presence system of claim 15 wherein said pre-defined threshold comprises a number of users that said one presence server can contain, whereby said operations performed by said merging and selecting modules are repeated until a number of users in said current largest user set is larger than a number of users that said one presence server can contain, when a compared result shows that a number of users in a current largest user set is less than or equal to a number of users that said one presence server can contain, and said determining module determines that the largest user set before a latest combination is treated as a user set to be allocated and cancels the latest merging.

17. The presence system of claim 15 wherein said predefined threshold is ½ of the number of users that said one presence server can contain.

18. The presence system of claim 15, further comprising a migrating module for migrating presence agents of the users in said user set to be allocated to said one presence server according to the result of said allocating step.

* * * * *